US011600175B2

(12) United States Patent
Tanaka et al.

(10) Patent No.: US 11,600,175 B2
(45) Date of Patent: Mar. 7, 2023

(54) INFORMATION PROCESSING APPARATUS, INFORMATION PROCESSING METHOD, AND ROAD SURFACE MARKING SYSTEM

(71) Applicant: TOYOTA JIDOSHA KABUSHIKI KAISHA, Toyota (JP)

(72) Inventors: Yurika Tanaka, Yokosuka (JP); Shuichi Sawada, Nagoya (JP); Shin Sakurada, Toyota (JP); Yasuhiro Baba, Kamo-gun (JP); Shintaro Matsutani, Kariya (JP); Tomoya Makino, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/410,541

(22) Filed: Aug. 24, 2021

(65) Prior Publication Data

US 2022/0076572 A1 Mar. 10, 2022

(30) Foreign Application Priority Data

Sep. 7, 2020 (JP) .............................. JP2020-149936

(51) Int. Cl.
*G08G 1/095* (2006.01)
*E01F 9/582* (2016.01)
*G06V 20/54* (2022.01)
*G08G 1/005* (2006.01)

(52) U.S. Cl.
CPC .............. *G08G 1/095* (2013.01); *E01F 9/582* (2016.02); *G06V 20/54* (2022.01); *G08G 1/005* (2013.01)

(58) Field of Classification Search
CPC ........ G08G 1/095; G08G 1/005; G06V 20/54; E01F 9/582
See application file for complete search history.

(56) References Cited

U.S. PATENT DOCUMENTS 8,874,366 B2 * 10/2014 Su ...................... G01C 21/3476
701/2
11,157,751 B2 * 10/2021 Kumano ................ G08G 1/167
2013/0113618 A1 * 5/2013 Flanagan ................ E01F 9/559
340/539.1

(Continued)

FOREIGN PATENT DOCUMENTS

JP H07-128059 A 5/1995
JP 2005-141363 A 6/2005

(Continued)

*Primary Examiner* — Mohamed Barakat
(74) *Attorney, Agent, or Firm* — Oliff PLC

(57) ABSTRACT

An information processing apparatus controls a road surface marking apparatus configured to form any road surface marking by changing light emission patterns of a plurality of light emitters provided on a road surface. In the information processing apparatus, a control unit detects, when switching from a second traffic lane through which a pedestrian is allowed to pass to a first traffic lane through which a pedestrian is prohibited from passing is executed, a user who is a pedestrian remaining in the first traffic lane after the switching. Then, the control unit causes the road surface marking apparatus to form an urging marking used for urging the user to withdraw from the first traffic lane after the switching.

20 Claims, 9 Drawing Sheets

(56) References Cited

U.S. PATENT DOCUMENTS

| | | | | |
|---|---|---|---|---|
| 2014/0097969 A1* | 4/2014 | Ni | ............................ | G08G 1/081 |
| | | | | 340/907 |
| 2018/0075747 A1* | 3/2018 | Pahwa | ................... | B60W 40/10 |
| 2019/0035263 A1* | 1/2019 | Loes | ....................... | G08G 1/095 |
| 2020/0108772 A1* | 4/2020 | Max | ...................... | G08G 1/0133 |
| 2020/0242922 A1* | 7/2020 | Dulberg | ................. | G08G 1/012 |

FOREIGN PATENT DOCUMENTS

| | | |
|---|---|---|
| JP | 2011-154480 A | 8/2011 |
| KR | 101974029 B1 | 4/2019 |
| WO | 2016/189777 A1 | 12/2016 |

\* cited by examiner

INFORMATION PROCESSING APPARATUS, INFORMATION PROCESSING METHOD, AND ROAD SURFACE MARKING SYSTEM

CROSS-REFERENCE TO RELATED APPLICATION

This application claims priority to Japanese Patent Application No. 2020-149936 filed on Sep. 7, 2020, incorporated herein by reference in its entirety.

BACKGROUND

1. Technical Field

The present disclosure relates to an information processing apparatus, an information processing method, and a road surface marking system that control road surface markings.

2. Description of Related Art

A technology for dividing respective facilities in a station square by lane lighting and changing the displayed position of the division by the lane lighting depending on the frequencies at which the facilities are used is well-known. Further, a technology for notifying a pedestrian and the like in advance when changing the displayed position of the division by the lane lighting has also been proposed (see, for example, Japanese Unexamined Patent Application Publication No. 2005-141363).

SUMMARY

The present disclosure provides a technology capable of changing the number and/or types of traffic lanes formed on a road.

A first aspect of the present disclosure is an information processing apparatus including a control unit. The control unit is configured to, when the number and/or types of traffic lanes formed on a road is switched by a road surface marking apparatus, detect a user who is a pedestrian remaining, after the switching, in a first traffic lane through which a pedestrian is prohibited from passing, and cause the road surface marking apparatus to form an urging marking used for urging the user to withdraw from the first traffic lane after the switching. The road surface marking apparatus is configured to change the number and/or the types of traffic lanes formed on the road by changing light emission patterns of a plurality of light emitters provided on a road surface.

In the first aspect, the control unit may detect, as the user, a pedestrian remaining in the first traffic lane at a time at which a predetermined time has elapsed since the road surface marking apparatus executed the switching, from a second traffic lane through which the pedestrian is allowed to pass to the first traffic lane.

In the first aspect, the control unit may specify a remaining area in which the user is positioned in the first traffic lane and cause the urging marking to blink in the remaining area.

In the first aspect, the control unit may specify the remaining area based on an image captured by a camera used for capturing an image of the road.

In the first aspect, the control unit may specify the remaining area based on a weight detected by a sensor used for detecting a weight of an object present on the road surface.

In the first aspect, the control unit may acquire a position of a third traffic lane through which the pedestrian is allowed to pass after the switching from the second traffic lane to the first traffic lane is executed, and include, in the urging marking, a marking used for guiding the user from the remaining area to the third traffic lane.

In the first aspect, the control unit may form a marking used for guiding the user to the third traffic lane on the road surface between the remaining area and the third traffic lane.

In the first aspect, the first traffic lane may be a lane through which a vehicle is allowed to pass. The control unit may execute a process for urging an occupant of the vehicle traveling on the first traffic lane to pay attention to the presence of the user.

In the first aspect, the control unit may form, on the first traffic lane, a marking used for suggesting the presence of the user in the first traffic lane.

In the first aspect, the control unit may transmit a command to warn the occupant of the vehicle to a terminal mounted on the vehicle.

An information processing method according to a second aspect of the present disclosure includes a first step of detecting, when the number and/or types of traffic lanes formed on a road is switched by a road surface marking apparatus, a user who is a pedestrian remaining in a first traffic lane through which a pedestrian is prohibited from passing after the switching, and a second step of causing the road surface marking apparatus to form an urging marking used for urging the user to withdraw from the first traffic lane after the switching. The road surface marking apparatus is configured to change the number and/or the types of traffic lanes formed on the road by changing light emission patterns of a plurality of light emitters provided on a road surface. The first step and the second step are executed by a computer.

In the second aspect, in the first step, the computer may detect, as the user, a pedestrian remaining in the first traffic lane at a time at which a predetermined time has elapsed since the road surface marking apparatus executed the switching, from a second traffic lane through which the pedestrian is allowed to pass to the first traffic lane.

In the second aspect, in the second step, the computer may execute a step of specifying a remaining area in which the user is positioned in the first traffic lane and a step of causing the urging marking to blink in the remaining area.

In the second aspect, in the step of specifying the remaining area, the computer may specify the remaining area based on an image captured by a camera used for capturing an image of the road.

In the second aspect, in the step of specifying the remaining area, the computer may specify the remaining area based on a weight detected by a sensor used for detecting a weight of an object present on the road surface.

In the second aspect, in the second step, the computer may execute a step of acquiring a position of a third traffic lane through which the pedestrian is allowed to pass after the switching from the second traffic lane to the first traffic lane is executed, and a step of including, in the urging marking, a marking used for guiding the user from the remaining area to the third traffic lane.

In the second aspect, in the second step, the computer may further execute a step of forming a marking used for guiding the user to the third traffic lane on the road surface between the remaining area and the third traffic lane.

In the second aspect, the first traffic lane may be a lane through which a vehicle is allowed to pass. The computer may further execute a third step of urging an occupant of the vehicle traveling on the first traffic lane to pay attention to the presence of the user.

In the second aspect, in the third step, the computer may form, on the first traffic lane, a marking used for suggesting the presence of the user in the first traffic lane.

A road surface marking system according to a third aspect of the present disclosure includes a road surface marking apparatus configured to change the number and/or types of traffic lanes formed on a road by changing light emission patterns of a plurality of light emitters provided on a road surface, and an information processing apparatus configured to control the road surface marking apparatus. The information processing apparatus includes a control unit that detects, when the number and/or the types of traffic lanes formed on the road is switched by the road surface marking apparatus, a user who is a pedestrian remaining in a first traffic lane through which a pedestrian is prohibited from passing after the switching, and causing the road surface marking apparatus to form an urging marking used for urging the user to withdraw from the first traffic lane after the switching.

Further, another aspect of the present disclosure includes an information processing program for causing a computer to execute the information processing method, or a non-transitory storage medium storing the information processing program in a computer-readable form.

With each aspect of the present disclosure, it is possible to provide a technology that can change the number and/or types of traffic lanes formed on a road.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
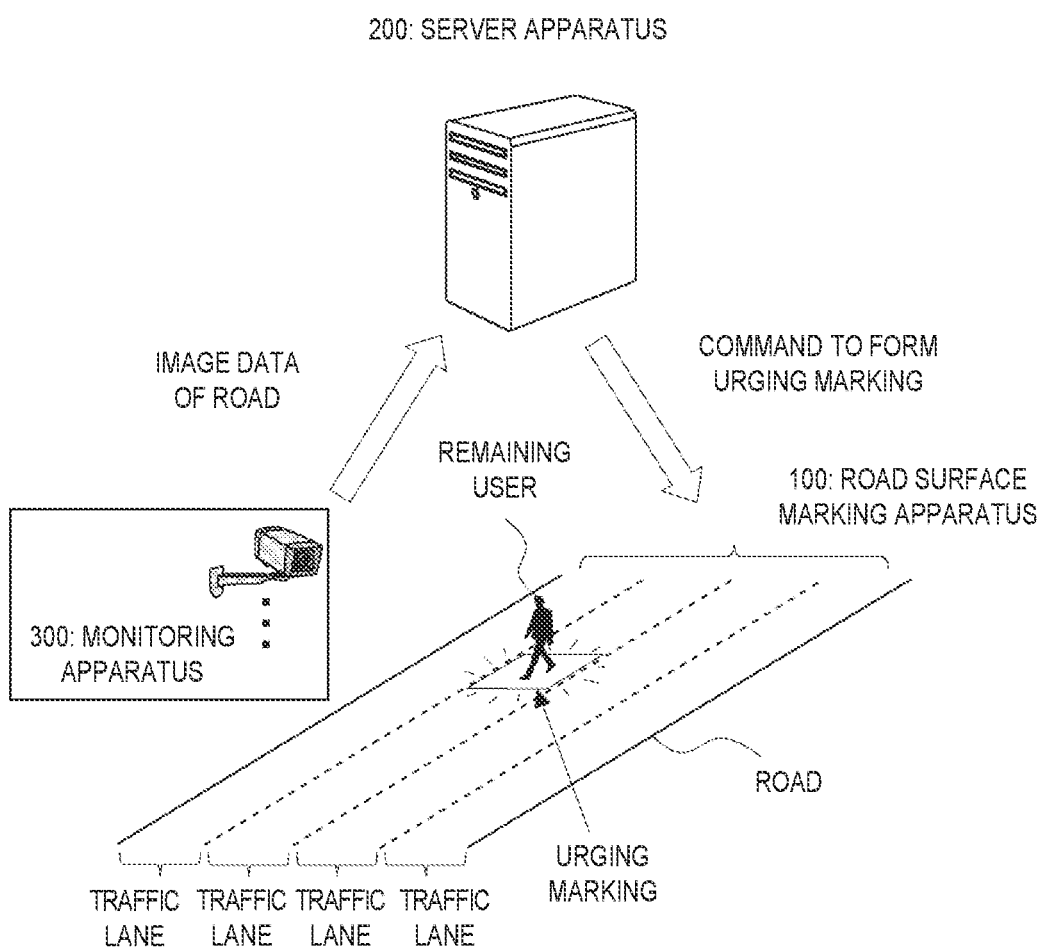
FIG. 1 is a diagram illustrating an overview of a road surface marking system.

Recently, an introduction of a road surface marking apparatus capable of forming any road marking by changing light emission patterns of a plurality of light emitters provided on a road surface has been examined. By using such a road surface marking apparatus, it is possible to change a position, a type and/or the like of a traffic lane formed on a road. Examples of the "traffic lane" referred to here include a vehicle-only traffic lane, a pedestrian-only traffic lane, a bicycle-only traffic lane, or a pedestrian-and-bicycle-only traffic lane. As such, it is possible to effectively use a road with a limited width. For example, in a time period in which the traffic volume of vehicles (such as automobiles and motorbikes) is relatively large, it is possible to facilitate the traffic of vehicles by increasing the number of vehicle-only traffic lanes. Further, in a time period in which the traffic volume of vehicles is relatively small, it is possible to facilitate the traffic of a pedestrian and/or a bicycle by increasing the number of pedestrian-only traffic lanes, bicycle-only traffic lanes, or pedestrian-and-bicycle-only traffic lanes. The road surface marking apparatus may be configured to project any marking on the road surface in combination with a projector provided above the road surface.

Here, in order to avoid confusion or the like when the number, types, and/or the like, of traffic lanes is changed, it is conceivable to execute notification in advance by voice or via a mobile terminal and the like. However, a user passing on the road to be changed may miss or overlook such a notification. For example, when a pedestrian-only traffic lane or a pedestrian-and-bicycle-only traffic lane is switched to a vehicle-only lane, a pedestrian may miss or overlook the notification sent in advance. There is a possibility that such a pedestrian could not have moved from the traffic lane to be changed or has entered the traffic lane to be changed. As a result, a situation may occur in which a pedestrian remains in the traffic lane (for example, a vehicle-only traffic lane) after the change.

On the other hand, in the information processing apparatus according to the present disclosure, when the number and/or types of traffic lanes formed on the road is switched by the road surface marking apparatus, the control unit detects a specific user. The "specific user" referred to here is a pedestrian who remains, after the switching, in a traffic lane (a first traffic lane) through which a pedestrian is prohibited from passing (hereinafter sometimes described as a "remaining user"). Upon detecting such a remaining user, the control unit causes the road surface marking apparatus to form a marking (an urging marking) used for urging the remaining user to withdraw from the first traffic lane. As such, it is possible to urge the remaining user to withdraw from the first traffic lane. In particular, even when the remaining user misses or overlooks the notification executed in advance, it is possible to urge the remaining user to withdraw from the first traffic lane. As a result, it is possible to more appropriately change the number and/or types of traffic lanes.

Here, the control unit may detect, as the remaining user, a pedestrian remaining in the first traffic lane at a time at which a predetermined time has elapsed since the road surface marking apparatus executed the switching from a traffic lane (a second traffic lane) through which a pedestrian is allowed to pass to the first traffic lane. Immediately after the switching from the second traffic lane to the first traffic lane, in addition to the pedestrian (a pedestrian who is not aware of the switching) who has missed or overlooked the notification executed in advance, a pedestrian (a pedestrian who is aware of the switching) who is in the middle of withdrawing may also remain in the first traffic lane. On the other hand, it is highly possible that the pedestrian remaining in the first traffic lane at a time at which a predetermined time has elapsed since the switching was executed is not aware of the switching. Therefore, by detecting, as the remaining user, the pedestrian remaining in the first traffic lane at a time at which a predetermined time has elapsed since the switching was executed, it is possible to more reliably urge the pedestrian who is not aware of the switching to withdraw from the first traffic lane.

The control unit may specify a remaining area in which the remaining user is positioned in the first traffic lane. Then, the control unit may cause the urging marking in the specified remaining area to blink. As such, it is possible to urge the remaining user to pay attention to the urging marking. As a result, it is possible to more reliably urge the remaining user to withdraw from the first traffic lane.

Here, as a method of specifying the remaining area, for example, a method of specifying an area in which the remaining user is positioned based on an image captured by a camera used for capturing images of the road may be used. Alternatively, as another method, a method of specifying an area in which the remaining user is positioned based on a weight detected by a sensor used for detecting a weight of an object present on the road surface may be used.

When the remaining user has not been aware of the switching from the second traffic lane to the first traffic lane, even if the remaining user is aware of the switching by looking at the urging marking, there is a possibility that the remaining user may not immediately know of an appropriate withdrawal destination. Then, the control unit may acquire the position of a third traffic lane through which the pedestrian is allowed to pass after the switching from the second traffic lane to the first traffic lane is executed and include, in the urging marking, a marking used for guiding the remaining user from the remaining area to the third traffic lane. As such, by looking at the urging marking, the remaining user can swiftly move from the remaining area to the third traffic lane.

When the urging marking includes the marking used for guiding the remaining user from the remaining area to the third traffic lane, the control unit may form a marking used for guiding the remaining user to the third traffic lane on the road surface between the remaining area and the third traffic lane. As such, it is possible to more reliably guide the remaining user from the remaining area to the third traffic lane.

Here, when a vehicle is allowed to pass through the first traffic lane, the control unit may further execute a process for urging an occupant of the vehicle traveling on the first traffic lane to pay attention to the presence of the remaining user. For example, the control unit may form, on the first traffic lane, a marking used for suggesting the presence of the remaining user in the first traffic lane. Further, the control unit may transmit a command to warn the occupant of the vehicle to a terminal mounted on the vehicle traveling on the first traffic lane. The terminal mounted on the vehicle may be an installed terminal (for example, a car navigation system) included in the vehicle or a terminal (a smartphone, a mobile phone, a tablet computer, a notebook computer, a wearable computer, and the like) carried by the occupant. As such, the occupant of the vehicle can recognize that the remaining user is present in the first traffic lane on which the vehicle is traveling. As a result, the occupant of the vehicle can slow down or temporarily stop the vehicle.

Embodiments

Hereinafter, embodiments of the present disclosure will be described in detail with reference to drawings. Unless otherwise specified, the dimensions, materials, shapes, relative arrangements, and the like of the components described in the present embodiment are not intended to limit the technical scope of the present disclosure. In the present embodiment, an example of applying the present disclosure to a road surface marking system will be described.

Overview of Road Surface Marking System

FIG. 1 is a diagram illustrating an overview of a road surface marking system. The road surface marking system changes the number and/or types of traffic lanes formed on a road by changing a road marking formed on a road surface. When the number and/or types of traffic lanes formed on the road has been switched, the road surface marking system executes a process for urging a pedestrian (the remaining user) remaining, after the switching, in the traffic lane (the first traffic lane) through which the pedestrian is prohibited from passing to withdraw from the first traffic lane. Such a road surface marking system includes a road surface marking apparatus 100, a server apparatus 200, and a monitoring apparatus 300. Examples of the first traffic lane through which the pedestrian is prohibited from passing include a traffic lane through which vehicles, such as automobiles, motorbikes, or bicycles, are allowed to pass. Further, the first traffic lane may be a traffic lane through which all moving objects including the pedestrian are prohibited from passing.

The road surface marking apparatus 100 forms a road marking including text, illustrations, and/or the like, using a plurality of light emitters provided on the road surface. By changing a light emitter 101 to be lit from among the light emitters 101, such a road surface marking apparatus 100 can change the content of the road marking. For example, by changing the light emitter 101 to be lit, the road surface marking apparatus 100 can change the position and/or the number of section lines indicating a boundary of a traffic lane. Further, by changing the light emitter 101 to be lit, the road surface marking apparatus 100 can also change the type, and the like, of a regulatory marking (a marking that regulates a moving object that can pass through each traffic lane, a marking that regulates a passing direction of each traffic lane, or the like) formed on the road surface. As such, the road surface marking apparatus 100 can form any number and/or types of traffic lanes on the road. In addition to the above-described functions, the road surface marking apparatus 100 of the present embodiment also has a function of forming an urging marking on the road surface. For example, when the type of the traffic lane formed on a part of the road is switched from the second traffic lane to the first traffic lane, the road surface marking apparatus 100 forms an urging marking on the road surface of the first traffic lane in response to a request from the server apparatus 200. The "urging marking" referred to here is used for urging the pedestrian to withdraw from the first traffic lane.

The server apparatus 200 is an information processing apparatus that controls the road surface marking apparatus 100. For example, the server apparatus 200 acquires the number of moving objects (a predicted traffic volume) that are predicted to pass on a road in which the road surface marking apparatus 100 is provided (hereinafter sometimes referred to as a "target road"). Such a predicted traffic volume is acquired for each type of moving object and for each time period. At that time, the predicted traffic volume of various moving objects in each time period may be acquired by using an external service or predicted by the server apparatus 200. Examples of the types of moving objects include pedestrians, bicycles, motorbikes, and automobiles. When the predicted traffic volume of various moving objects in each time period is acquired, the server apparatus 200 determines the number and/or types of traffic lanes formed on the target road in each time period based on the predicted traffic volume of various moving objects in each time period. Then, the server apparatus 200 controls the road surface marking apparatus 100 based on the determined number and/or types of traffic lanes.

Further, in the present embodiment, when the traffic lane formed on the target road is switched from the second traffic lane to the first traffic lane, the server apparatus 200 detects the pedestrian (the remaining user) remaining in the first traffic lane after the switching. At that time, the server apparatus 200 detects the presence/absence of the remaining user based on information from the monitoring apparatus 300. The monitoring apparatus 300 includes, for example, a camera 301 configured to capture an image of the entire area of the target road. The server apparatus 200 determines whether a remaining user is present in the first traffic lane based on the image captured by the camera 301 of the monitoring apparatus 300.

When the remaining user is present in the first traffic lane, the server apparatus 200 specifies the area (the remaining area) in which the remaining user is positioned in the first traffic lane. At that time, by dividing the target road into a plurality of areas in advance and checking information on the divided areas against the image captured by the camera 301, the server apparatus 200 may specify the remaining area.

Upon specifying the remaining area, the server apparatus 200 generates a command to form an urging marking on the road surface of the remaining area (hereinafter, also referred to as an "urging marking command"). Examples of the urging marking in the present embodiment include a marking used for indicating the type of the first traffic lane after the switching (the type of moving object that can pass through the first traffic lane) and a marking used for urging the remaining user to withdraw from the first traffic lane after the switching. The urging marking may include a marking used for guiding the remaining user to an appropriate withdrawal destination. In that case, the server apparatus 200 acquires a position of a traffic lane (the third traffic lane) through which the pedestrian is allowed to pass after the switching from the second traffic lane to the first traffic lane is executed. Then, the server apparatus 200 includes, in the urging marking command, a command to include, in the urging marking, a marking used for guiding the pedestrian from the remaining area to the third traffic lane (for example, a marking used for indicating the direction in which the third traffic lane is positioned with respect to the remaining area). The urging marking command generated in such a manner is transmitted from the server apparatus 200 to the road surface marking apparatus 100.

Hardware Configuration of Road Surface Marking System

Figure 2:
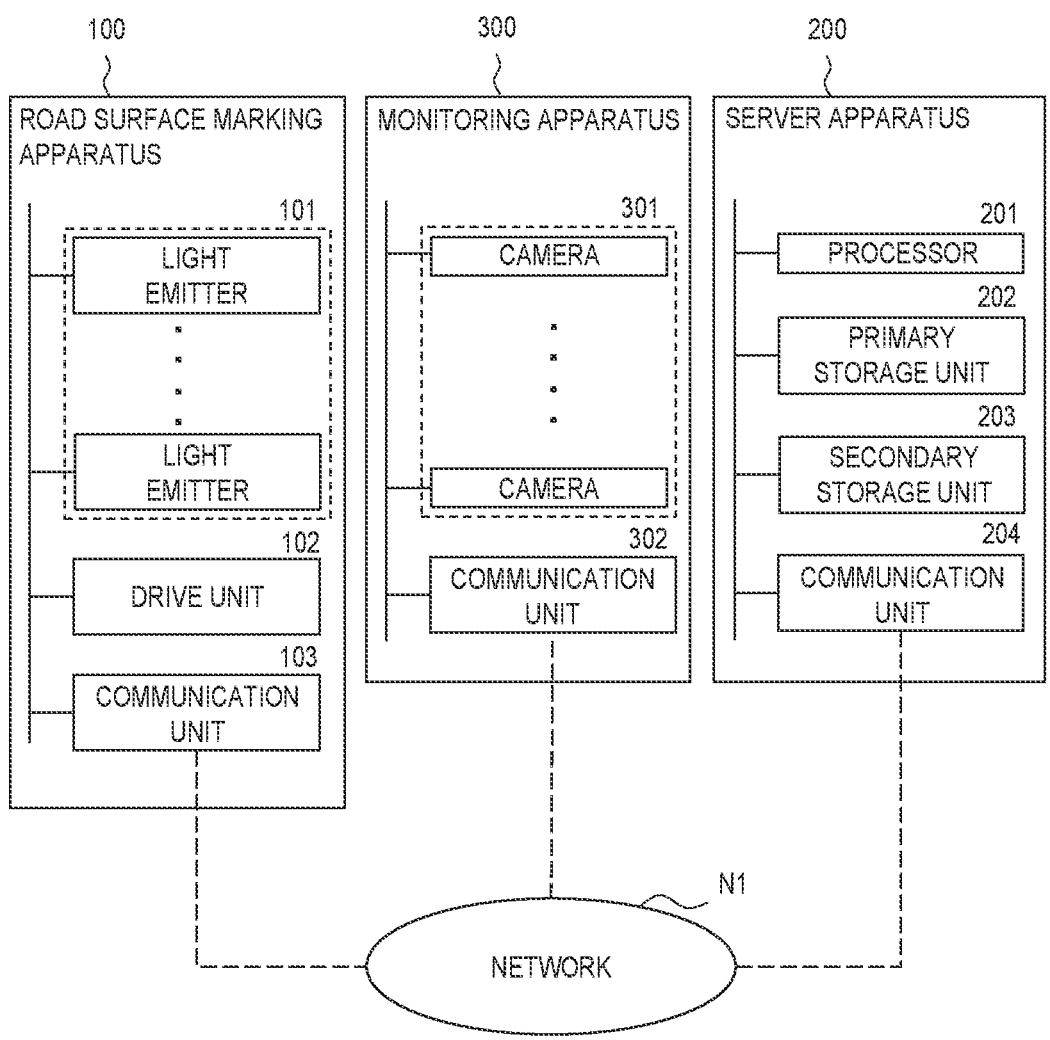
FIG. 2 is a diagram illustrating an example of a hardware configuration of a road surface marking apparatus.

Hereinafter, a hardware configuration of the road surface marking system will be described. FIG. 2 is a diagram illustrating hardware configurations of the road surface marking apparatus 100, the server apparatus 200, and the monitoring apparatus 300 illustrated in FIG. 1.

The road surface marking apparatus 100 forms any road marking on a road. Such a road surface marking apparatus 100 includes a plurality of light emitters 101, a drive unit 102, and a communication unit 103.

Figure 3:
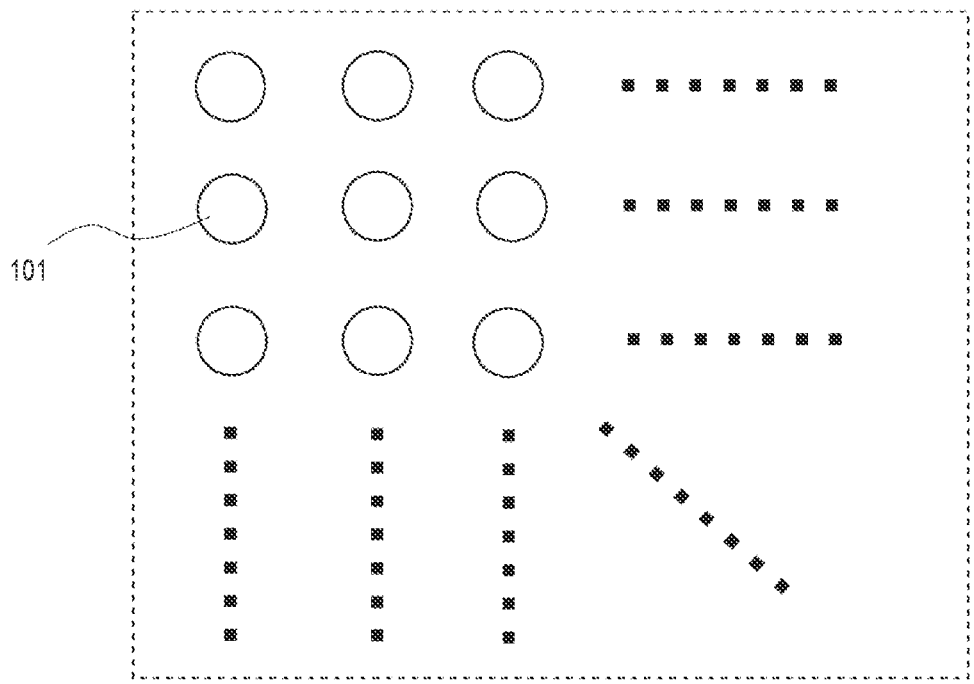
FIG. 3 is a diagram illustrating an example of an arrangement of light emitters.

The light emitters 101 may be provided on the road surface in, for example, a matrix, as illustrated in FIG. 3. The arrangement of the light emitters 101 is not limited to an example illustrated in FIG. 3, and any type of arrangement may be used as long as it can express any text, illustrations, and/or the like. The light emitter 101 provided on the road surface in such a manner is composed of, for example, a light-emitting diode (LED), an optical fiber, and the like.

The drive unit 102 is a circuit that individually drives the light emitters 101 and adjusts a light emission timing, a light emission amount, and the like, of each light emitter 101. For example, the drive unit 102 forms a road marking including text, illustrations, and/or the like by adjusting the light emission timing, light emission amount, and the like, of the light emitter 101 provided at any position from among the light emitters 101. Further, the drive unit 102 can also form a road marking including a dynamic illustration by successively changing the light emitters 101 to be lit. When each light emitter 101 includes LEDs having a plurality of colors, the drive unit 102 can also change the light emission color of each light emitter 101 by adjusting the light emission amount of the LEDs of each color in each light emitter 101.

The communication unit 103 is a device via which the road surface marking apparatus 100 is connected to a network N1. Examples of the "network N1" referred to here include a wide area network (WAN), which is a world-wide public communication network, such as the Internet, and other communication networks. The communication unit 103 connects the road surface marking apparatus 100 to the server apparatus 200 via the network N1. Such a communication unit 103 includes, for example, a local area network (LAN) interface board, or a wireless communication circuit for wireless communication. The road surface marking apparatus 100 and the server apparatus 200 may be electrically connected to each other without the network N1.

The hardware configuration of the road surface marking apparatus 100 is not limited to the above-described example, and components thereof may be omitted, replaced, or added as appropriate. For example, the road surface marking apparatus 100 may be composed by embedding an LCD, an EL panel, or the like, of which the surface is covered with a transparent protective member, such as tempered glass, in the road surface.

The server apparatus 200 is an information processing apparatus used for controlling the road surface marking apparatus 100. The server apparatus 200 has a general computer configuration. In other words, the server apparatus 200 includes a processor 201, a primary storage unit 202, a secondary storage unit 203, a communication unit 204, and the like. The processor 201, the primary storage unit 202, the secondary storage unit 203, the communication unit 204, and the like are connected to one another via buses.

Examples of the processor 201 include a central processing unit (CPU) or a digital signal processor (DSP). The processor 201 controls the server apparatus 200 and executes operations of various information processes.

The primary storage unit 202 includes, for example, a random access memory (RAM) and a read-only memory (ROM). Examples of the secondary storage unit 203 include an erasable programmable ROM (EPROM) or a hard disk drive (HDD). The secondary storage unit 203 may include a removable medium, that is, a portable recording medium. The removable medium may be a disc recording medium, such as a universal serial bus (USB) memory, a compact disc (CD), or a digital versatile disc (DVD). The secondary storage unit 203 stores various programs, various pieces of data, and various tables in the recording medium in a readable and writable manner. The secondary storage unit 203 may store an operating system (OS). Part or all of the information may be stored in the primary storage unit 202. Alternatively, a part or all of the information stored in the primary storage unit 202 may be stored in the secondary storage unit 203.

The communication unit 204 is a device via which the server apparatus 200 is connected to the network N1. Such a communication unit 204 connects the server apparatus 200 to the road surface marking apparatus 100 or to the monitoring apparatus 300 via the network N1. Such a communication unit 204 includes, for example, a LAN interface board or a wireless communication circuit for wireless communication.

The hardware configuration of the server apparatus 200 is not limited to the example illustrated in FIG. 3, and components thereof may be omitted, replaced, or added as appropriate. Further, a series of processes executed by the server apparatus 200 can be implemented by hardware, but can also be implemented by software.

The monitoring apparatus 300 monitors a target road. In the present embodiment, the monitoring apparatus 300 includes a camera 301 and a communication unit 302. A plurality of cameras 301 and the communication unit 302 are connected to one another via buses.

The camera 301 captures an image of the entire area of a target road. At that time, one camera 301 may capture the image of the entire area of the target road, or the plurality of cameras 301 may capture the image of the entire area of the target road. As such a camera 301, an existing surveillance camera or a security camera may be used, or a dedicated camera may be provided.

The communication unit 302 is a device via which the monitoring apparatus 300 is connected to the network N1. The communication unit 302 connects the monitoring apparatus 300 to the server apparatus 200 via the network N1. Such a communication unit 302 includes, for example, a LAN interface board or a wireless communication circuit for wireless communication. The monitoring apparatus 300 and the server apparatus 200 may be electrically connected to each other without the network N1.

The hardware configuration of the monitoring apparatus 300 is not limited to the example illustrated in FIG. 3, and components thereof may be omitted, replaced, or added as appropriate.

Functional Configuration of Server Apparatus

Figure 4:
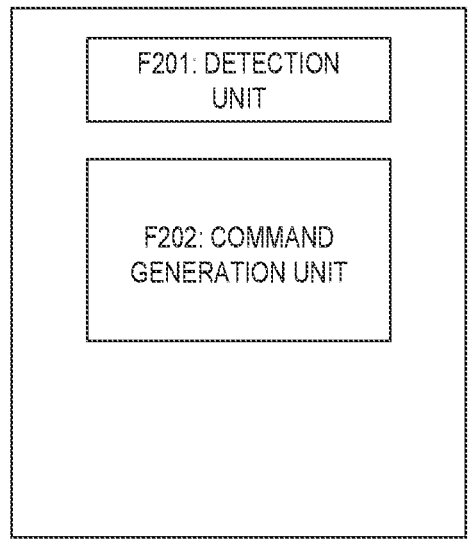
FIG. 4 is a block diagram illustrating an example of a functional configuration of a server apparatus.

Next, a functional configuration of the server apparatus 200 will be described with reference to FIG. 4. The server apparatus 200 in the present embodiment includes a detection unit F201 and a command generation unit F202, as functional components thereof. Functions of the detection unit F201 and the command generation unit F202 are implemented when the processor 201 executes a program stored in the primary storage unit 202 or the secondary storage unit 203. Any one or a part of the detection unit F201 and the command generation unit F202 may be formed by a hardware circuit. Further, any one of the functions of the detection unit F201 and the command generation unit F202, or a part of the processes thereof, may be executed by another computer connected to the network N1. For example, each process of the detection unit F201 and each process of the command generation unit F202 may be executed by different computers.

When the traffic lane formed on a part of the target road is switched from the second traffic lane to the first traffic lane, the detection unit F201 detects the presence/absence of a remaining user in the first traffic lane after the switching. At that time, by communicating with the monitoring apparatus 300 via the communication unit 204, the detection unit F201 first acquires data of the image captured by the camera 301 of the monitoring apparatus 300. Next, the detection unit F201 crops the image of the portion in which the first traffic lane is shown from the acquired image data. Then, the detection unit F201 determines whether a pedestrian is shown in the cropped image. When a pedestrian is shown in the cropped image, the detection unit F201 determines that a remaining user is present in the first traffic lane.

A process for detecting a remaining user may be executed immediately after the switching from the second traffic lane to the first traffic lane is executed, but may be executed at a time at which a predetermined time has elapsed since the switching was executed. This is because immediately after the switching from the second traffic lane to the first traffic lane is executed, in addition to a pedestrian who is not aware of the switching, a pedestrian who is aware of the switching and in the middle of withdrawing from the first traffic lane may also remain in the first traffic lane. On the other hand, it is highly possible that the pedestrian who remains in the first traffic lane at a time at which a predetermined time has elapsed since the switching was executed is not aware of the switching. Therefore, by detecting the pedestrian who remains in the first traffic lane as the remaining user at a time at which a predetermined time has elapsed since the switching was executed, it is possible to detect, as the remaining user, the pedestrian who is passing through the first traffic lane without being aware of the switching.

When the presence of the remaining user is detected by the above-described method, the image data acquired from the monitoring apparatus 300 is transferred from the detection unit F201 to the command generation unit F202.

Figure 5:
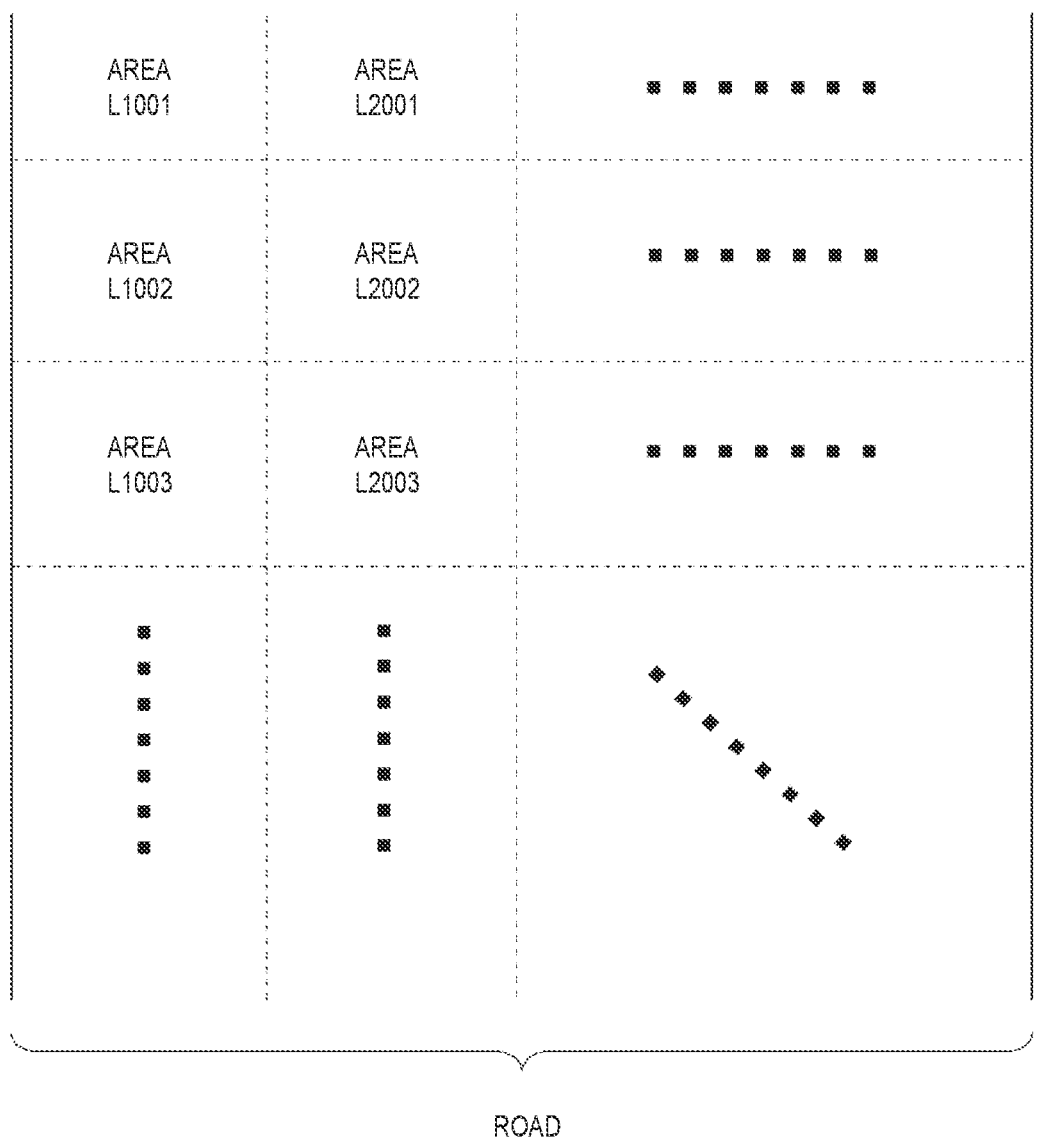
FIG. 5 is a diagram illustrating an example of a method of dividing a target road into a plurality of areas.

The command generation unit F202 specifies the remaining area based on the image data received from the detection unit F201. As described above, the "remaining area" referred to here is an area in which the remaining user is positioned in the first traffic lane. In specifying such a remaining area, target roads may be divided into a plurality of grid-shaped areas, as illustrated in FIG. 5. Then, the command generation unit F202 may specify the area in which the remaining user is positioned by checking the image data received from the detection unit F201 against the area information as illustrated in FIG. 5. The method of specifying the remaining area is not limited to the above-described method. For example, the command generation unit F202 may determine the latitude and longitude of the place in which the remaining user is positioned based on the image data received from the detection unit F201 and specify the remaining area from the determined latitude and longitude.

Upon specifying the remaining area by the above-described method, the command generation unit F202 generates a command to form an urging marking on the road surface of the specified remaining area (an urging marking command). Such an urging marking command includes information indicating the remaining area, a command to be described below, and the like.

First command: A command to form a marking used for indicating the type of moving object that can pass through the first traffic lane on the road surface of the remaining area Second command: A command to form a marking used for urging the remaining user to withdraw from the first traffic lane on the road surface of the remaining area In addition to the above-described information and commands, the urging marking command may include a command to form the marking used for guiding the remaining user to an appropriate withdrawal destination on the road surface of the remaining area. In that case, the command generation unit F202 first acquires a position of the traffic lane (the third traffic lane) through which the pedestrian is allowed to pass after the switching from the second traffic lane to the first traffic lane is executed. Subsequently, the command generation unit F202 specifies the direction in which the third traffic lane is positioned with respect to the remaining area (hereinafter, sometimes referred to as a "withdrawal direction"). Then, the command generation unit F202 generates a command to form the above-described marking used for indicating the withdrawal direction on the road surface of the remaining area and includes the generated command in the urging marking command. Further, the urging marking command may include a command to cause the urging marking to blink. The urging marking command generated in such a manner is transmitted to the road surface marking apparatus 100 via the communication unit 204.

Flow of Processing

Figure 6:
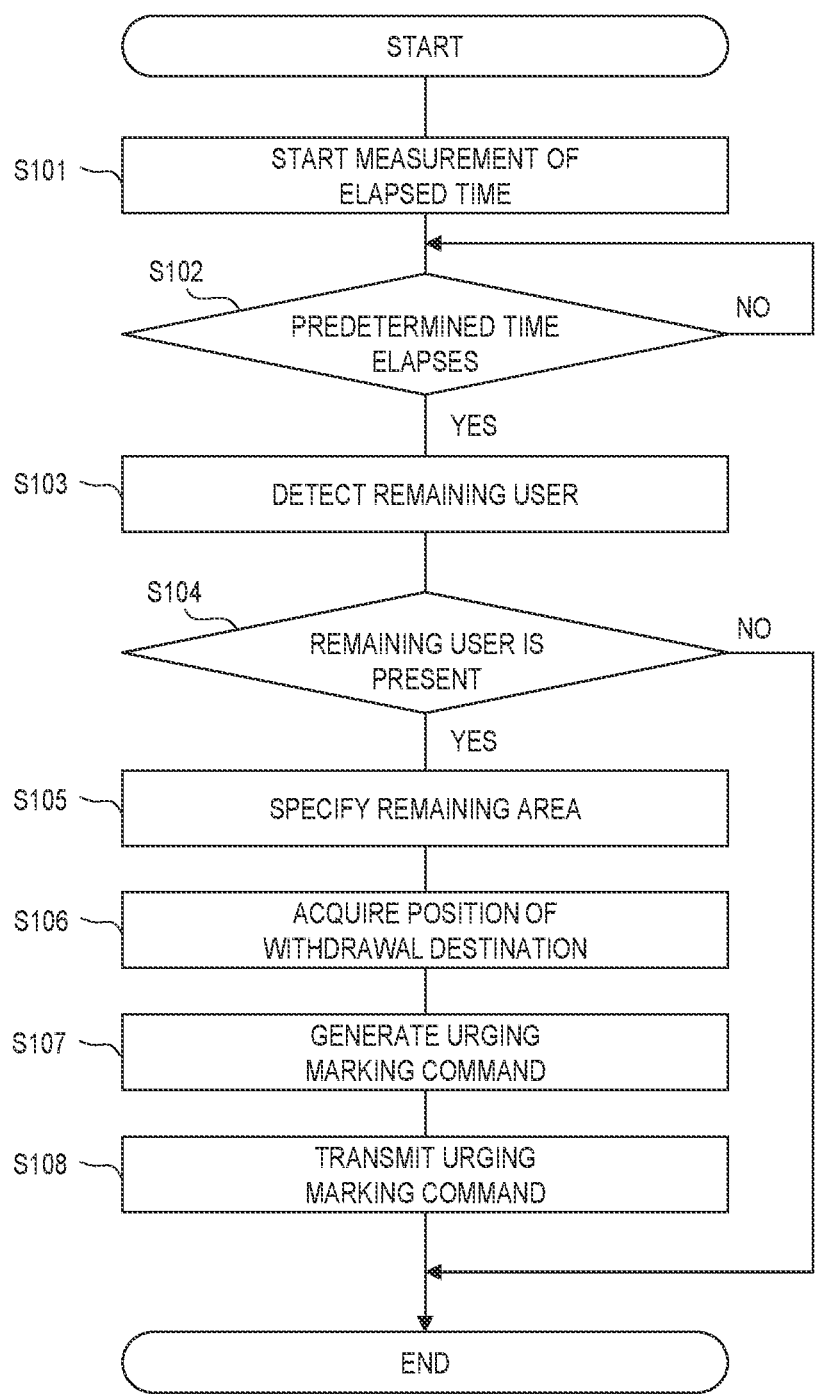
FIG. 6 is a flowchart illustrating a flow of processing executed at the server apparatus according to an embodiment.

Next, a flow of processing executed by the server apparatus 200 will be described with reference to FIG. 6. FIG. 6 is a flowchart illustrating a flow of the processing executed by the server apparatus 200 in response to a fact that the traffic lane formed on a part of a target road is switched from the second traffic lane to the first traffic lane.

In the flow of the processing of FIG. 6, when the traffic lane formed on the part of the target road is switched from the second traffic lane to the first traffic lane, the detection unit F201 of the server apparatus 200 starts measuring the elapsed time (step S101). The "elapsed time" referred to here is an elapsed time since the switching from the second traffic lane to the first traffic lane was executed.

In step S102, the detection unit F201 determines whether a predetermined time has elapsed since the switching from the second traffic lane to the first traffic lane was executed. In other words, the detection unit F201 determines whether the elapsed time is equal to or longer than the predetermined time. When the elapsed time is shorter than the predetermined time (a negative determination in step S102), the detection unit F201 repeatedly executes the process of step S102. On the other hand, when the elapsed time is equal to or longer than the predetermined time (a positive determination in step S102), the detection unit F201 executes the process of step S103.

In step S103, the detection unit F201 executes a process for detecting a remaining user. Specifically, the detection unit F201 first acquires data of the image captured by the camera 301 of the monitoring apparatus 300 by communicating with the monitoring apparatus 300 via the communication unit 204. Next, the detection unit F201 crops the image of the portion in which the first traffic lane after the switching is shown from the acquired image data. Then, the detection unit F201 determines whether a pedestrian is shown in the cropped image. When no pedestrian is shown in the cropped image, the detection unit F201 determines that no remaining user is present (a negative determination) in step S104. In that case, the execution of the flow of the processing is ended. On the other hand, when a pedestrian is shown in the cropped image, the detection unit F201 determines that a remaining user is present (a positive determination) in step S104. In that case, the detection unit F201 transfers the image data acquired from the monitoring apparatus 300 to the command generation unit F202.

Upon receiving the image data from the detection unit F201, the command generation unit F202 specifies the remaining area based on the image data (step S105). Specifically, the command generation unit F202 may specify the area in which the remaining user is positioned by checking the image data received from the detection unit F201 against the above-described area information as illustrated in FIG. 5.

Upon specifying the remaining area in step S105, the command generation unit F202 acquires a position of a place which is a withdrawal destination of the remaining user (step S106). As described above, the "withdrawal destination" referred to here is a traffic lane (the third traffic lane) through which the pedestrian is allowed to pass after the switching from the second traffic lane to the first traffic lane is executed.

In step S107, the command generation unit F202 generates the urging marking command. The urging marking command includes, for example, information indicating the remaining area specified in step S105 and the following four commands.

First command: A command to form a marking used for indicating the type of moving object that can pass through the first traffic lane on the road surface of the remaining area Second command: A command to form a marking used for urging the remaining user to withdraw from the first traffic lane on the road surface of the remaining area Third command: A command to form a marking used for guiding the remaining user to the third traffic lane (a marking used for indicating the withdrawal direction) on the remaining area Fourth command: A command to cause the urging marking to blink In generating the third command, the command generation unit F202 specifies the withdrawal direction based on the position of the remaining area specified in step S105 and the position of the third traffic lane acquired in step S106.

The urging marking command generated in step S107 is transmitted from the command generation unit F202 to the road surface marking apparatus 100 via the communication unit 204 (step S108).

Figure 7:
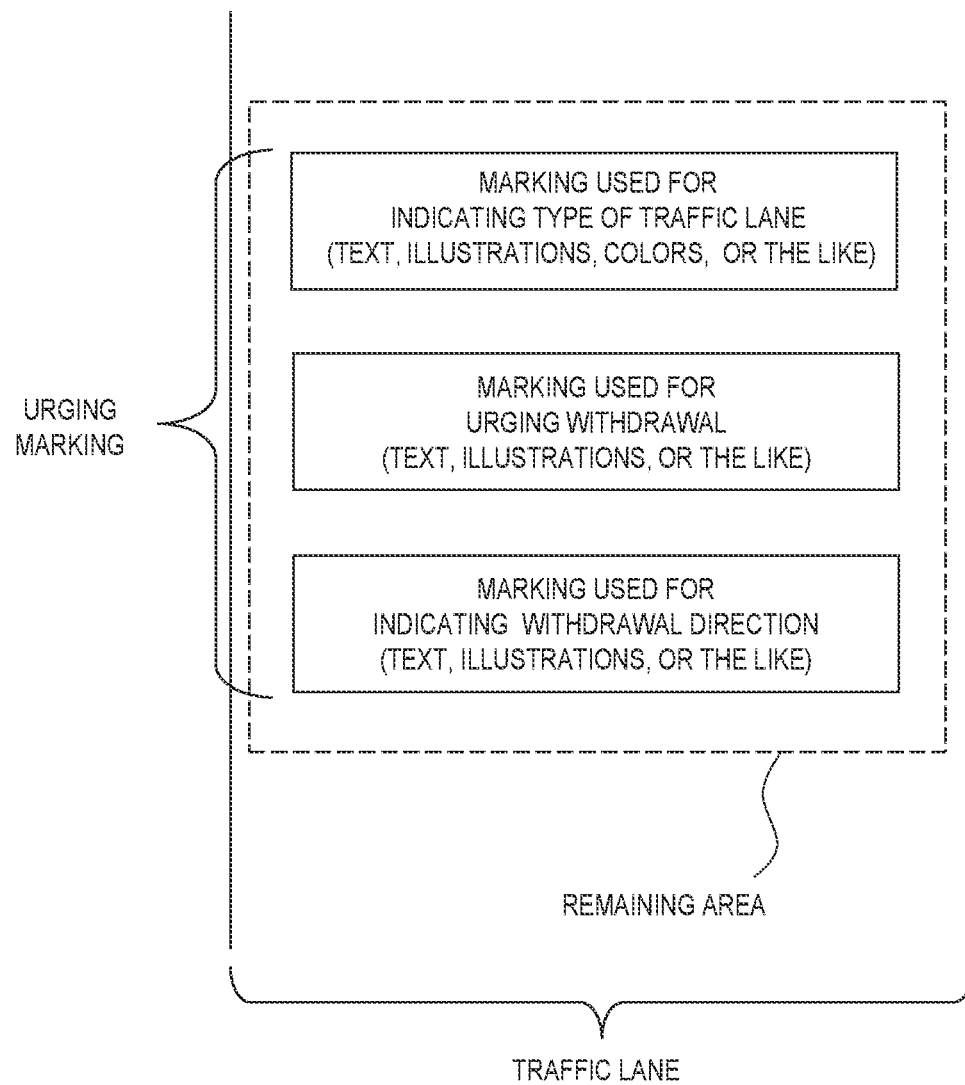
FIG. 7 is a diagram illustrating an example of an urging marking.

When the urging marking command is received by the communication unit 103 of the road surface marking apparatus 100, the command is transferred to the drive unit 102. The drive unit 102 forms the urging marking on the road surface of the remaining area by driving the light emitter 101 of the remaining area according to the urging marking command. As such, as illustrated in FIG. 7, the urging marking including the following three markings is formed and blinks on the road surface of the remaining area.

First marking: A marking used for expressing the type of the first traffic lane (the type of moving object that can pass through the first traffic lane) with text, illustrations, colors, or the like Second marking: A marking used for expressing a message urging the remaining user to withdraw from the first traffic lane (the remaining area) with text, illustrations, colors, or the like.

Third marking: A marking used for expressing the withdrawal direction with text, illustrations, colors, or the like.

Figure 8:
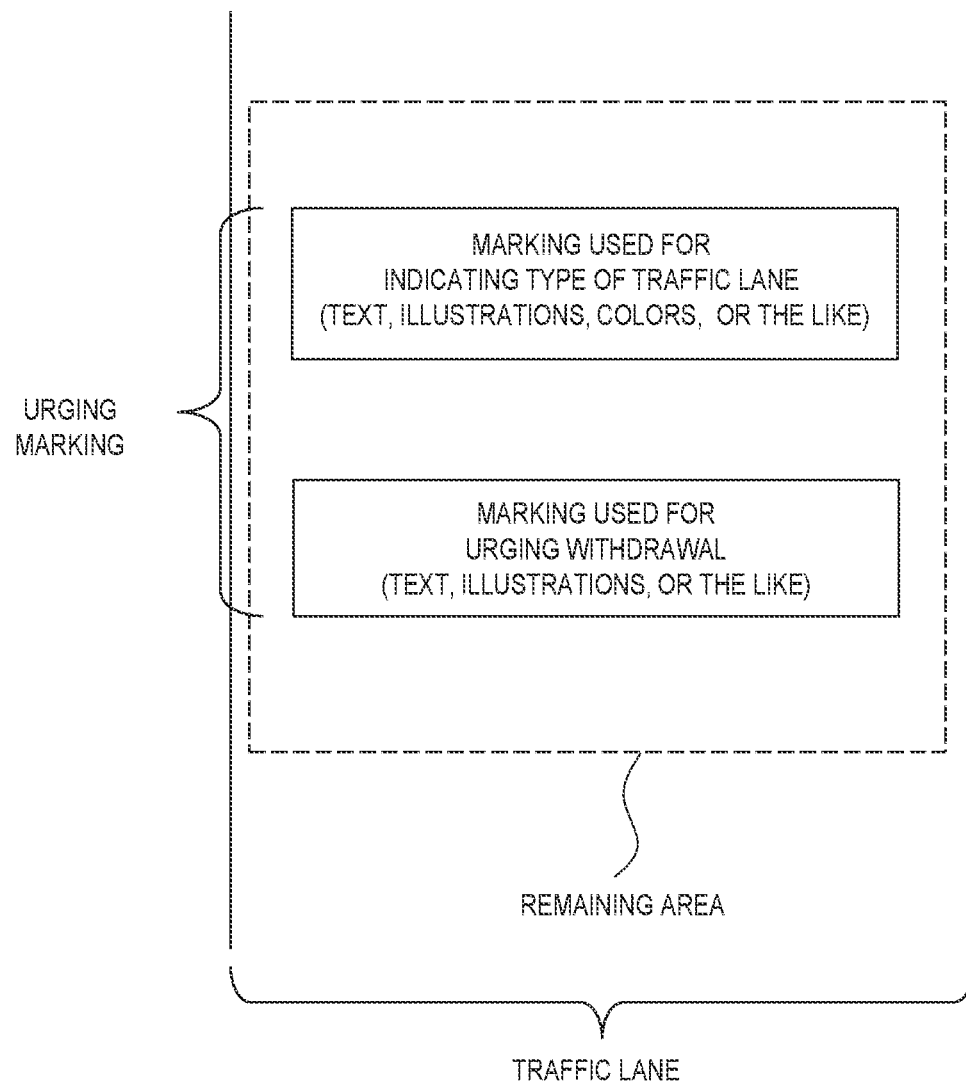
FIG. 8 is a diagram illustrating another example of the urging marking.

As illustrated in FIG. 8, the urging marking may be formed so as to include only two markings, that is, the first marking and second marking. In that case, the command generation unit F202 generates an urging marking command including the above-described first command, second command, and fourth command.

According to the flow of the processing of FIG. 6, when the switching from the second traffic lane to the first traffic lane is executed and a pedestrian (the remaining user) remaining in the first traffic lane after the switching is present, the urging marking is formed on the road surface of the area (the remaining area) in which the remaining user is positioned. As such, even when the remaining user passes through the first traffic lane without being aware of the switching, it is possible to make the remaining user recognize that the switching has been executed. At that time, it is possible to urge the remaining user to pay attention to the urging marking by causing it to blink. As a result, it is possible to make the remaining user more reliably recognize the content of the marking included in the urging marking. Further, it is possible to urge the remaining user to withdraw from the first traffic lane by including the above-described second marking in the urging marking. In addition, it is possible to make the remaining user swiftly recognize the position of the withdrawal destination (the third traffic lane) from the remaining area by including the above-described third marking in the urging marking. As such, the remaining user can swiftly move from the first traffic lane to the third traffic lane.

Therefore, with the road surface marking system according to the present embodiment, it is possible to more appropriately change the number and/or types of traffic lanes formed on the road.

In the present embodiment, the example where the urging marking is formed only on the road surface of the remaining area has been described, but the urging marking may be formed on the road surface of the entire area of the first traffic lane.

First Modified Example

A marking used for guiding the remaining user to the third traffic lane (hereinafter sometimes referred to as a "guiding marking") may also be formed on the road surface between the remaining area and the third traffic lane. At that time, the command generation unit F202 of the server apparatus 200 specifies an area through which the remaining user is predicted to pass when he/she moves from the remaining area to the third traffic lane in the shortest time (hereinafter sometimes referred to as a "passing area"). For example, the command generation unit F202 specifies the passing area based on the position of the remaining area, the position of the third traffic lane, and the above-described area information as illustrated in FIG. 5. Then, the command generation unit F202 generates a command to form a guiding marking on the road surface of the above-described passing area (hereinafter sometimes referred to as a "guiding marking command"). The guiding marking command includes information indicating the passing area and a command to form a marking used for indicating the traveling direction from the passing area to the third traffic lane on the road surface of the passing area. The traveling direction from the passing area to the third traffic lane is determined based on the positional relationship between the passing area and the third traffic lane. The guiding marking command generated in such a manner is transmitted from the server apparatus 200 to the road surface marking apparatus 100 together with the urging marking command.

Flow of Processing

Figure 9:
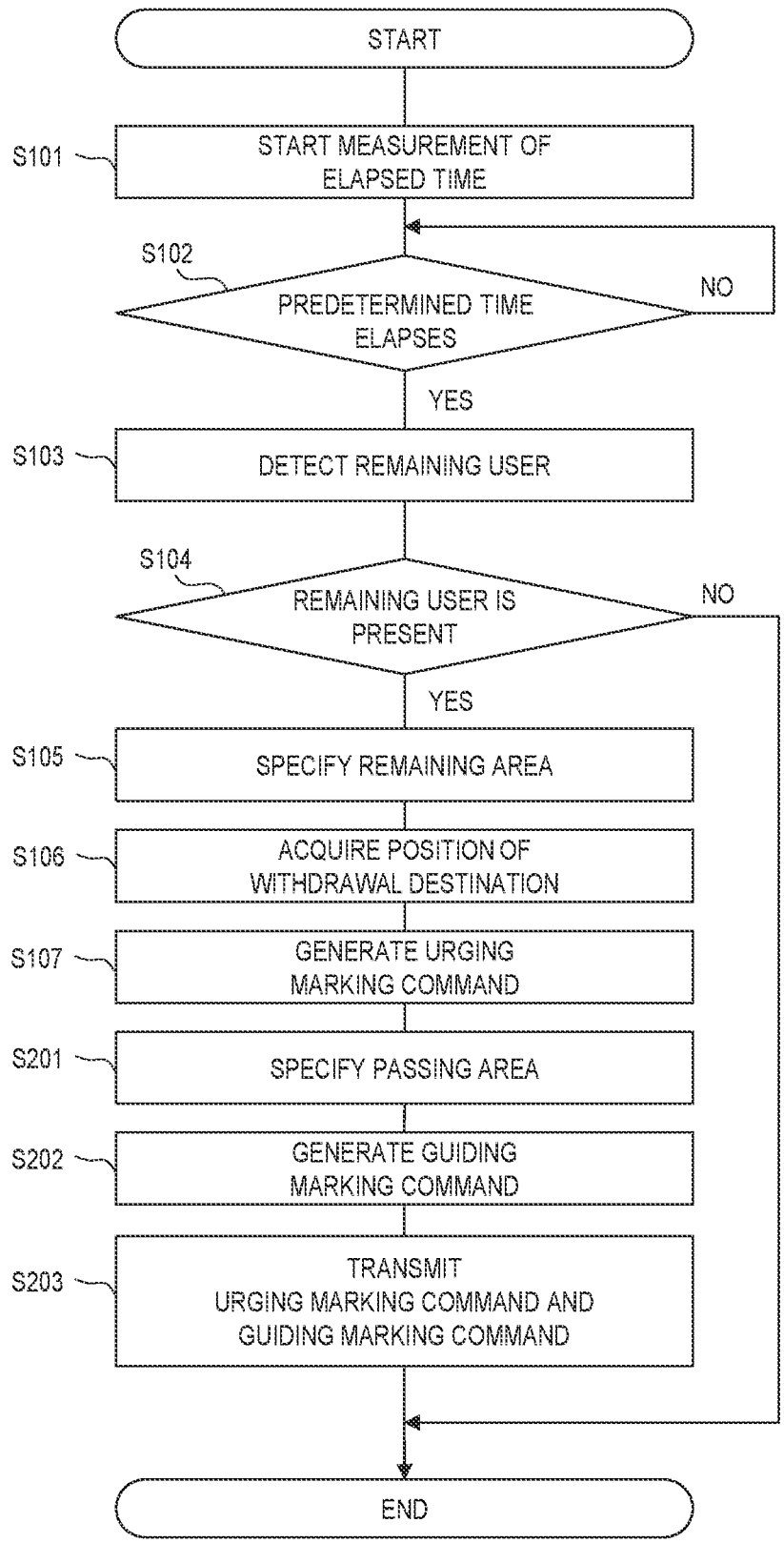
FIG. 9 is a flowchart illustrating a flow of processing executed at the server apparatus according to a modified example.

Here, a flow of processing executed by the server apparatus 200 in this modified example will be described with reference to FIG. 9. FIG. 9 is a flowchart illustrating a flow of the processing executed by the server apparatus 200 in response to a fact that a traffic lane formed on a part of a target road is switched from the second traffic lane to the first traffic lane. In FIG. 9, the same steps as those in FIG. 6 described above will be denoted by the same step numbers.

In the flow of the processing of FIG. 9, instead of the process of step S108, the processes of steps S201 to S203 are executed.

In step S201, the command generation unit F202 specifies the passing area. At that time, as described above, the command generation unit F202 specifies the passing area based on the position of the remaining area, the position of the third traffic lane, and the above-described area information as illustrated in FIG. 5.

In step S202, the command generation unit F202 generates the guiding marking command. In this modified example, the guiding marking command includes the information indicating the passing area and the command to form a marking used for indicating the traveling direction from the passing area to the third traffic lane on the road surface of the passing area. In generating the above-described guiding marking command, the command generation unit F202 determines the traveling direction from the passing area to the third traffic lane based on the position of the third traffic lane acquired in step S106 and the position of the passing area specified in step S201.

In step S203, the command generation unit F202 transmits the urging marking command generated in step S107 and the guiding marking command generated in step S202 to the road surface marking apparatus 100 via the communication unit 204.

Figure 10:
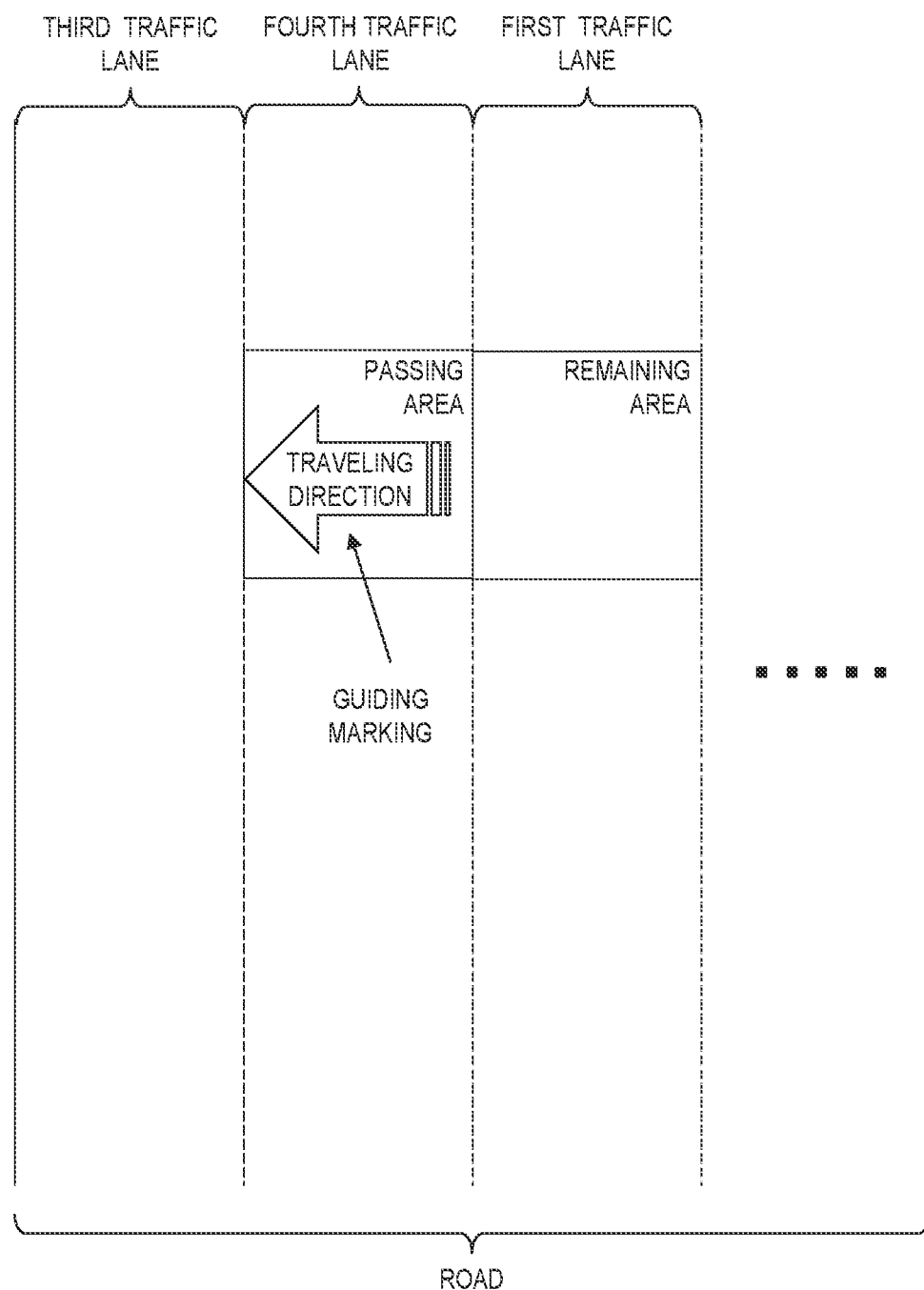
FIG. 10 is a diagram illustrating an example of a guiding marking.

When the above-described urging marking command and guiding marking command are received by the communication unit 103 of the road surface marking apparatus 100, the commands are transferred to the drive unit 102. The drive unit 102 forms the urging marking on the road surface of the remaining area by driving the light emitter 101 of the remaining area according to the urging marking command. As such, it is possible to form an urging marking similar to that in the above-described embodiment on the road surface of the remaining area. Further, the drive unit 102 forms the guiding marking on the road surface of the passing area by driving the light emitter 101 of the passing area according to the guiding marking command. In that case, as illustrated in FIG. 10, the marking used for indicating the traveling direction from the passing area to the third traffic lane is formed on the road surface of the passing area. In FIG. 10, a "fourth traffic lane" is a traffic lane through which the pedestrian is prohibited from passing.

According to the flow of the processing of FIG. 9, it is possible to form the urging marking on the road surface of the remaining area and the guiding marking on the road surface of the passing area. As such, the remaining user can more swiftly move to the third traffic lane.

When the remaining area and the third traffic lane are adjacent to each other (that is, when the fourth traffic lane is not formed between the remaining area and the third traffic lane), in a manner similar to that in the above-described embodiment, only the urging marking command is transmitted from the server apparatus 200 to the road surface marking apparatus 100.

Second Modified Example

In the above-described embodiment, an example where the monitoring apparatus 300 includes the plurality of cameras 301 has been described. Alternatively, the monitoring apparatus 300 may include a weight sensor instead of the camera 301. The "weight sensor" referred to here is a sensor that detects weights of a person, a vehicle, and the like positioned on the target road. In that case, the server apparatus 200 may, for example, determine the presence/absence of a remaining user and specify an area in which he/she is positioned based on the weight detected by a weight sensor provided in the first traffic lane after the switching from among a plurality of weight sensors. As such, it is possible to obtain the same advantageous effect as that of the above-described embodiment.

Third Modified Example

Further, when the remaining user is present in the first traffic lane (for example, the period in which the remaining user is moving from the remaining area to the third traffic lane), the server apparatus 200 may execute a process for urging the occupant of the vehicle traveling on the first traffic lane to pay attention to the presence of the remaining user. For example, the server apparatus 200 may cause the road surface marking apparatus 100 to from the marking used for suggesting the presence of the remaining user in the first traffic lane on the road surface of the first traffic lane.

Alternatively, the server apparatus 200 may transmit a command to warn the occupant of the vehicle (hereinafter sometimes referred to as a "warning command") to a terminal mounted on the vehicle traveling on the first traffic lane. The terminal mounted on the vehicle may be a terminal installed in the vehicle (for example, a car navigation system) or a terminal (a smartphone, a mobile phone, a tablet computer, a notebook computer, a wearable computer, and the like) carried by the occupant. As such, the occupant of the vehicle can recognize that the remaining user is present in the first traffic lane on which the vehicle is traveling. As a result, the occupant of the vehicle can slow down or temporarily stop the vehicle.

When the above-described warning command is transmitted to a vehicle traveling in a place away from the remaining area, the vehicle may be hindered from smoothly traveling. Therefore, the above-described warning command may be transmitted only to the vehicle traveling in the vicinity of the remaining area. For example, a communication device used for executing near-field wireless communication may be provided in each area of a target road so that the above-described warning command is transmitted via the communication device of the remaining area.

Others

The above-described embodiments and modified examples are merely examples, and the present disclosure can be appropriately modified and implemented within a range not departing from the scope thereof. For example, the above-described embodiments and modified examples have described an example where, when the switching from the second traffic lane to the first traffic lane is executed, the pedestrian remaining in the first traffic lane after the switching is detected as the remaining user. Alternatively, regardless of the type of traffic lane before the switching, the pedestrian remaining in the first traffic lane after the switching may be detected as the remaining user.

Further, the processes and elements described in the above-described embodiments and modified examples can be freely combined and implemented within a range in which no technical contradiction arises. In addition, the processing described as being executed by a single device may be shared and executed by a plurality of devices. Alternatively, the process described as being executed by different devices may also be executed by a single device. In the computer system, it is possible to flexibly change a hardware configuration in which each function is implemented.

Further, the present disclosure can also be implemented by supplying a computer program for having the functions described in the embodiments in a computer, and reading and executing the program by one or more processors included in the computer. Such a computer program may be provided to a computer by a non-transitory computer-readable storage medium that can be connected to a system bus of the computer, or may be provided to the computer or via a network. The non-transitory computer-readable storage medium is a recording medium in which information, such as data and programs, is accumulated by an electrical, magnetic, optical, mechanical or chemical action and from which the information can be read by the computer or the like. Examples of such a recording medium may include any kind of disk, such as a magnetic disk (a floppy® disk, a hard disk drive (HDD), and the like), an optical disk (a CD-ROM, a DVD disk, a Blu-ray disk, and the like), a read-only memory (ROM), a random access memory (RAM), an EPROM, an EEPROM, a magnetic card, a flash memory, an optical card, a solid state drive (SSD), and the like.

What is claimed is:

1. An information processing apparatus comprising a control unit having a processor including a central processing unit, wherein the control unit is configured to:
   when a number or kinds of traffic lanes formed on a road is switched by a road surface marking apparatus having circuitry disposed therein, detect a user who is a pedestrian remaining, after the switching, in a first traffic lane through which a pedestrian is prohibited from passing, the road surface marking apparatus being configured to change the number or the kinds of traffic lanes formed on the road by changing light emission patterns of a plurality of light emitters provided on a road surface; and
   cause the road surface marking apparatus to form an urging marking used for urging the user to withdraw from the first traffic lane after the switching.

2. The information processing apparatus according to claim 1, wherein the control unit is configured to detect, as the user, the pedestrian remaining in the first traffic lane at a time at which a predetermined time has elapsed since the road surface marking apparatus executed the switching, from a second traffic lane through which the pedestrian is allowed to pass to the first traffic lane.

3. The information processing apparatus according to claim 2, wherein the control unit is configured to specify a remaining area in which the user is positioned in the first traffic lane and cause the urging marking to blink in the remaining area.

4. The information processing apparatus according to claim 3, wherein the control unit is configured to specify the remaining area based on an image captured by a camera used for capturing an image of the road.

5. The information processing apparatus according to claim 3, wherein the control unit is configured to specify the remaining area based on a weight detected by a sensor used for detecting a weight of an object present on the road surface.

6. The information processing apparatus according to claim 3, wherein the control unit is configured to:
   acquire a position of a third traffic lane through which the pedestrian is allowed to pass after the switching from the second traffic lane to the first traffic lane is executed; and
   include, in the urging marking, a marking used for guiding the user from the remaining area to the third traffic lane.

7. The information processing apparatus according to claim 6, wherein the control unit is configured to form the marking used for guiding the user to the third traffic lane on the road surface between the remaining area and the third traffic lane.

8. The information processing apparatus according to claim 1, wherein:
   the first traffic lane is a lane through which a vehicle is allowed to pass; and
   the control unit is configured to execute a process for urging an occupant of the vehicle traveling on the first traffic lane to pay attention to presence of the user.

9. The information processing apparatus according to claim 8, wherein the control unit is configured to form, on the first traffic lane, a marking used for suggesting the presence of the user in the first traffic lane.

10. The information processing apparatus according to claim 8, wherein the control unit is configured to transmit a command to warn the occupant of the vehicle to a terminal mounted on the vehicle.

11. An information processing method comprising:
a first step of detecting, when the a number or kinds of traffic lanes formed on a road is switched by a road surface marking apparatus, a user who is a pedestrian remaining, after the switching, in a first traffic lane through which a pedestrian is prohibited from passing, the road surface marking apparatus being configured to change the number or the kinds of traffic lanes formed on the road by changing light emission patterns of a plurality of light emitters provided on a road surface; and
a second step of causing the road surface marking apparatus to form an urging marking used for urging the user to withdraw from the first traffic lane after the switching, the first step and the second step being executed by a computer.

12. The information processing method according to claim 11, wherein, in the first step, the computer detects, as the user, the pedestrian remaining in the first traffic lane at a time at which a predetermined time has elapsed since the road surface marking apparatus executed the switching, from a second traffic lane through which the pedestrian is allowed to pass to the first traffic lane.

13. The information processing method according to claim 12, wherein, in the second step, the computer executes:
a step of specifying a remaining area in which the user is positioned in the first traffic lane; and
a step of causing the urging marking to blink in the remaining area.

14. The information processing method according to claim 13, wherein, in the step of specifying the remaining area, the computer specifies the remaining area based on an image captured by a camera used for capturing an image of the road.

15. The information processing method according to claim 13, wherein, in the step of specifying the remaining area, the computer specifies the remaining area based on a weight detected by a sensor used for detecting a weight of an object present on the road surface.

16. The information processing method according to claim 13, wherein, in the second step, the computer executes:
a step of acquiring a position of a third traffic lane through which the pedestrian is allowed to pass after the switching from the second traffic lane to the first traffic lane is executed; and
a step of including, in the urging marking, a marking used for guiding the user from the remaining area to the third traffic lane.

17. The information processing method according to claim 16, wherein, in the second step, the computer further executes a step of forming a-the marking used for guiding the user to the third traffic lane on the road surface between the remaining area and the third traffic lane.

18. The information processing method according to claim 11, wherein:
the first traffic lane is a lane through which a vehicle is allowed to pass; and
the computer further executes a third step of urging an occupant of the vehicle traveling on the first traffic lane to pay attention to presence of the user.

19. The information processing method according to claim 18, wherein, in the third step, the computer forms, on the first traffic lane, a marking used for suggesting the presence of the user in the first traffic lane.

20. A road surface marking system comprising:
a road surface marking apparatus configured to change a number or kinds of traffic lanes formed on a road by changing light emission patterns of a plurality of light emitters provided on a road surface; and
an information processing apparatus configured to control the road surface marking apparatus,
wherein the information processing apparatus includes a control unit having a processor including a central processing unit, the control unit configured to:
when the number or the kinds of traffic lanes formed on the road is switched by the road surface marking apparatus having circuitry disposed therein, detect a user who is a pedestrian remaining, after the switching, in a first traffic lane through which a pedestrian is prohibited from passing; and
cause the road surface marking apparatus to form an urging marking used for urging the user to withdraw from the first traffic lane after the switching.

* * * * *